Patented Dec. 22, 1953

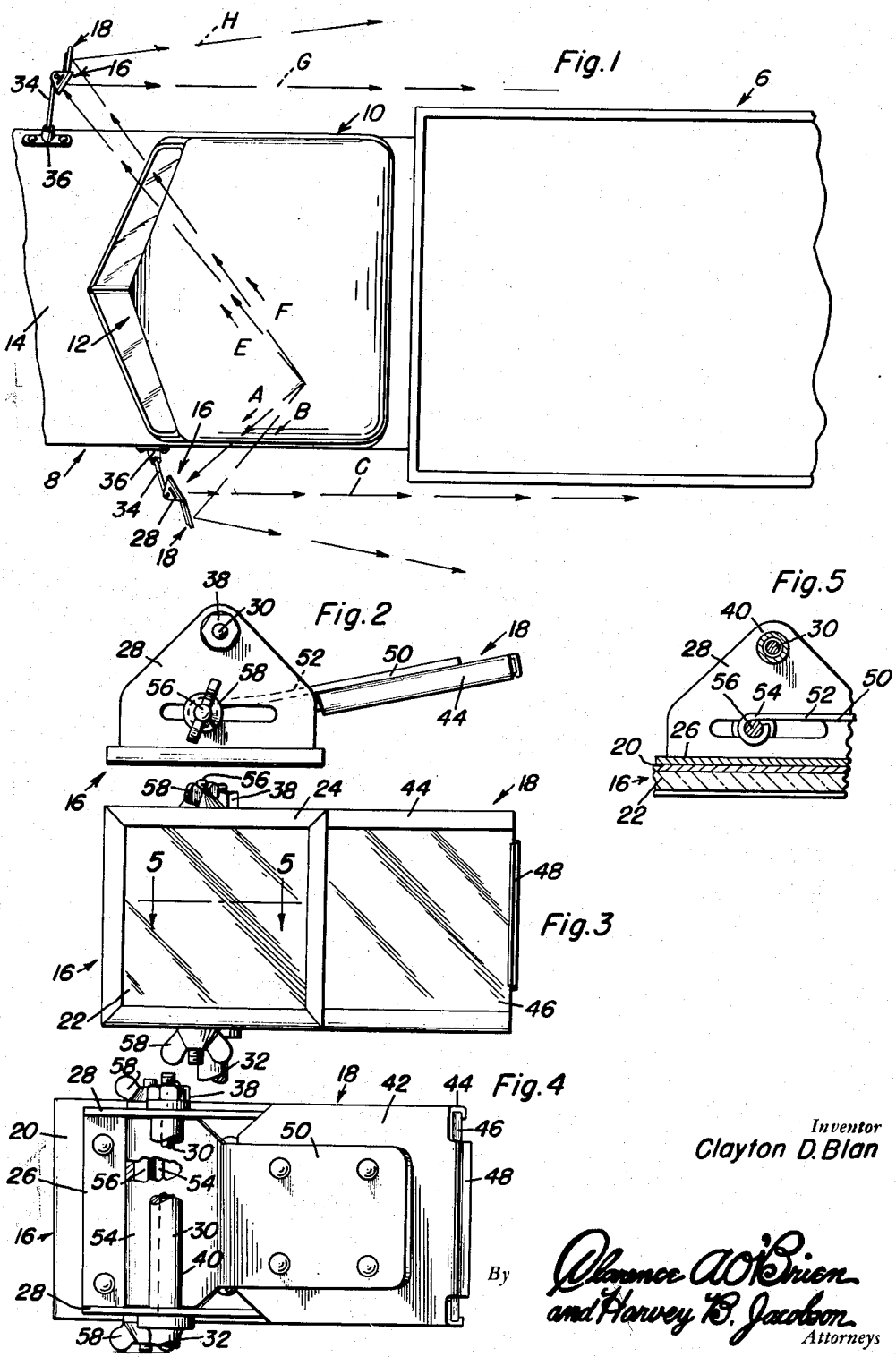

2,663,225

UNITED STATES PATENT OFFICE 2,663,225

REARVIEW MIRROR MEANS

Clayton D. Blan, Tucson, Ariz.

Application December 11, 1950, Serial No. 200,205

1 Claim. (Cl. 88—87)

The present invention relates to certain new and useful improvements in rear view mirror means and has more particular reference to exterior mirrors which, when arranged on left and right sides of a vehicle, provide adequate facilities susceptible of giving the driver a wide ranging panoramic interpretation of traffic conditions to the driver's rear.

Many conveyances, particularly motor vehicles in the truck category, require, to promote safe and sane driving, a fairly extensive panoramic view of the over-all traffic picture not only to the rear but rearwardly of the driver on both left and right sides or lanes as the case may be. In the circumstances, it is common practice to depend a great deal on so-called exterior type rear view mirrors. These are of many and varied forms and are attached in different positions for efficient tell-tale results relative to angles of incidence and angles of reflection. The present invention depends, in part, on a novel arrangement of properly constructed and paired mirrors which are applicable to the right and left hand sides of the vehicle and in specified positions relative to the windshield. Primarily, however, the invention has to do with a twin mirror assembly characterized by a relatively fixed supporting bracket and a pair of primary and secondary mirrors. In the assembly chosen, the primary mirror is inward or closest to the driver and the secondary or companion mirror is outwardly situated, whereby with the two mirrors available and angularly adjusted in respect to each other effective image pick-up and reflecting results are assured.

More specifically, novelty is predicated on a primary mirror which is detachably and adjustably mounted on the spindle portion of a supporting bracket and a secondary complemental or companion mirror, which is hingedly and slidably mounted on the first-named mirror, making it possible to adjust both mirrors, as a unit, or to adjust the secondary mirror relative to the primary mirror.

Other objects and advantages will become more readily apparent from the following description and the accompanying sheet of illustrative drawings.

In the accompanying sheet of drawings, wherein like numerals are employed to designate like parts throughout the views:

Figure 1 is a top plan view of a motor vehicle, say a truck or the like, portions being fragmentarily shown, and the arrangement of mirrors being revealed in accordance with the concepts of the instant invention;

Figure 2 is a top plan view of the mirror assembly; that is, the aforementioned primary and secondary mirrors;

Figure 3 is a face elevational view of the mirror assembly seen in top plan in Figure 2;

Figure 4 is a view of the reverse side of the assemblage depicted in Figure 3, with portions broken away to bring out some of the details of construction; and Figure 5 is a fragmentary view taken on the horizontal line 5—5 of Figure 3, looking in the direction of the arrows.

Referring now to the drawings and especially to Fig. 1, the body of the truck or other vehicle is denoted generally by the numeral 6 and the forward portion, which may be a tractor, is denoted at 8 and this includes a cab or equivalent enclosure for the driver which is denoted at 10 and further includes what represents a suitable windshield construction 12. The numeral 14 may designate the engine hood, bonnet or other equivalent construction. Since the mirror means on both sides of the vehicle is the same in construction it seems unnecessary to utilize separate numerals and lead lines. Instead, it is satisfactory, it is believed, to merely describe one twin mirror arrangement or assembly and to utilize like reference numerals for the like parts in both assemblies. To this end, the inwardly disposed main mirror unit is denoted by the numeral 16 and the complemental or companion secondary mirror unit is denoted at 18. Taking up mirror unit 16, this comprises a suitable rectangular or equivalent backing plate 20 having an appropriate reflecting mirror 22 mounted thereon and held by a suitable marginal rim construction 24. The backing plate is soldered or otherwise secured to the bight portion 26 (see Fig. 5) of a U-shaped attaching and adjusting adapter. The latter includes horizontal spaced parallel limbs 28 having apertures for passage of the stud or spindle portion 30 (see Fig. 4) of the vertical portion 32 of the bracket arm 34 shown more completely in Fig. 1. The bracket arm, the one on the left for instance, is attached to the body structure as at 34 in requisite position in respect to the windshield and driver in the cab. By passing this spindle up through the limbs or ears 28 and securing the same with a nut 38 the desired detachable and adjustable association of parts is had. It is preferred, however, to use a spacing sleeve 40 around the spindle 30 and this is interposed between the ears or limbs 28 as brought out satisfactorily in Figs. 4 and 5. So far it will be seen that the mirror unit 16 is detachable and adjustable in that said mirror may be swung in a horizontal arcuate plane on the vertical axis provided by the hinge connection between the ears 28 of the adapter and the mirror mounting.

The outwardly disposed companion mirror 18 comprises a backing plate 42 having marginal frame means 44 holding the mirror 46 in place. If desired, a bent flange or lateral clip 48 may be provided to facilitate insertion and removal of the mirror 46. There is a hinging leaf 50 provided and this is riveted to the backing plate and has a widened end portion 52 which is bent upon itself to provide a hinge knuckle 54. This knuckle is mounted between the ears 28 and surrounds the pintle 56. This pintle is slidable in slots 57 provided therefor in the aforementioned ears, the pintle having its ends threaded to accommodate assembling and clamping wing-nuts 58. Therefore, the mirror unit 18 is slidable and swingable in relation to the mirror unit 16. It follows that both mirrors may be collectively adjusted, as a unit, in relation to the fixed supporting bracket. In addition the mirror 18 may be adjusted independently by swinging it in a horizontal plane on a vertical axis and also by sliding it in the pintle and slot means referred to.

In Fig. 1 the arrangement of mirrors is shown with two mirrors arranged on the right and two on the left. The ones on the left are somewhat in line with the windshield means 12 and the ones on the right are in advance of the cab and windshield. This gives the driver lines of vision in the directions of the arrows A and B toward the left, giving a reflection of images representing the traffic on the left and toward the rear somewhat in keeping with the indication lines C and D, respectively. By glancing to the right in a direction of arrows E and F the driver has recourse to traffic conditions denoted by the vision lines G and H, respectively.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed:

Having described the invention, what is claimed as new is:

A dual mirror assembly for rear view use on the exterior of the body of a motor vehicle comprising a primary inwardly disposable mirror having a backing plate provided with a marginal frame with said mirror fitted in said frame and against said backing plate, upper and lower spaced parallel ears integral with and extending at right angles from said backing plate, said ears having free disconnected end portions having bearing means spaced from the backing plate and adapted to straddle and be pivotally mounted on a vertical spindle portion of a relatively stationary attaching and supporting bracket, each ear being provided, in close spaced parallelism with the backing plate, with an elongated pintle-accommodating slot, the respective slots being in registry one above the other, a complemental secondary outwardly disposable mirror embodying a mirror and a supporting frame therefor, a flat hinging leaf having one end portion superimposed against and secured to the frame of the secondary mirror and having its opposite end end portion projecting beyond one marginal edge portion of said secondary mirror and situated in the space between said ears, a hinging pintle spanning said space having its end portions slidably mounted in the respective slots, the projecting end portion of said hinging leaf having a knuckle and said knuckle being attached to and operable in conjunction with said pintle pin, whereby to permit said mirrors to be adjusted as a unit as well as independently in relation to one another.

CLAYTON D. BLAN.

References Cited in the file of this patent

UNITED STATES PATENTS

| Number | Name | Date |
|---|---|---|
| 1,892,860 | Wehr et al. | Jan. 3, 1933 |
| 1,895,566 | Bertell et al. | Jan. 31, 1933 |
| 1,918,802 | Fleischer | July 18, 1933 |
| 2,214,639 | Lenta | Sept. 10, 1940 |
| 2,279,751 | Hensley | Apr. 14, 1942 |
| 2,320,904 | Bachkai | June 1, 1943 |
| 2,582,651 | Peterson | Jan. 15, 1952 |

FOREIGN PATENTS

| Number | Country | Date |
|---|---|---|
| 312,802 | Great Britain | June 6, 1929 |
| 758,441 | France | Nov. 3, 1933 |